No. 841,065. PATENTED JAN. 8, 1907.
G. F. STEEDMAN.
ELEVATOR.
APPLICATION FILED JULY 2, 1906.
2 SHEETS—SHEET 1.
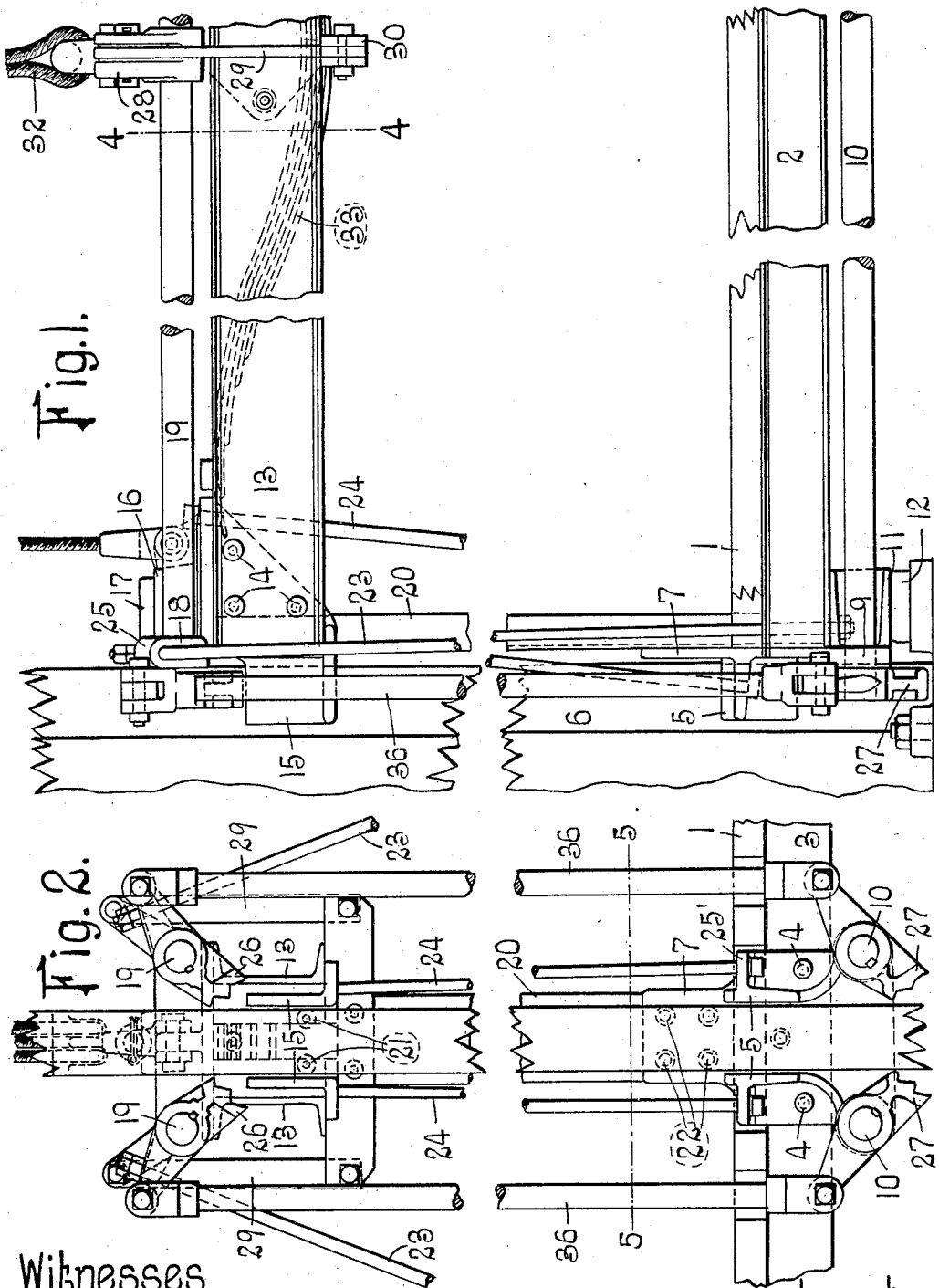
Witnesses
Edgar T. Farmer.
Wells L. Church
Inventor:
George F. Steedman
by Bakewell Cornwall Abb'y's.

No. 841,065.
PATENTED JAN. 8, 1907.
G. F. STEEDMAN.
ELEVATOR.
APPLICATION FILED JULY 2, 1906.
2 SHEETS—SHEET 2.
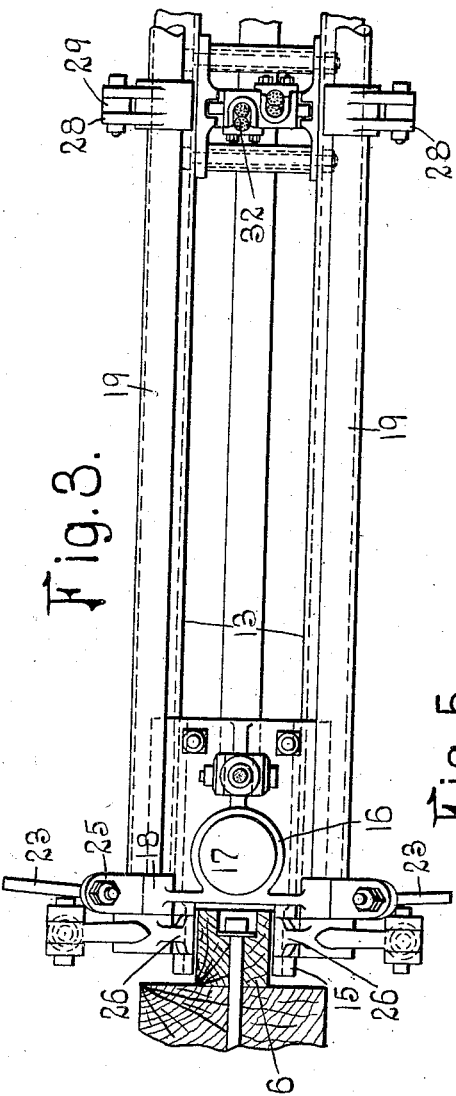
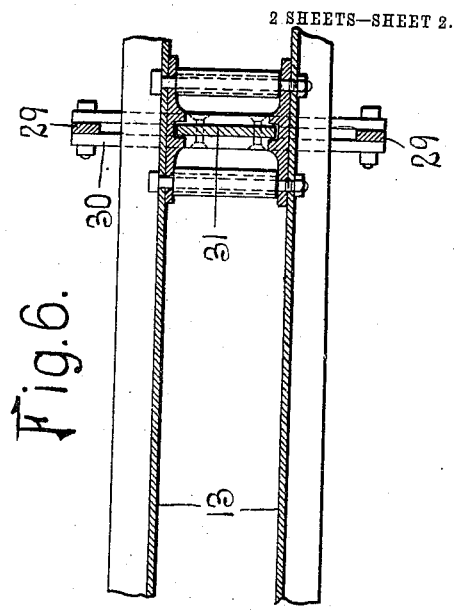
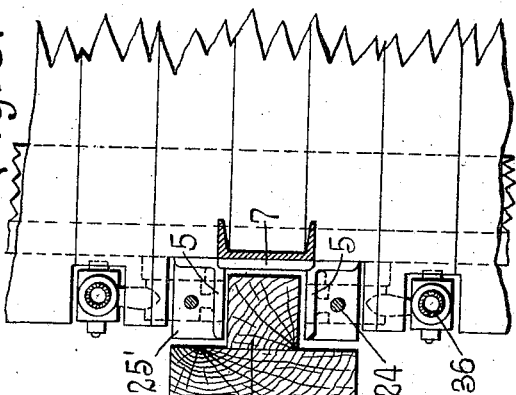
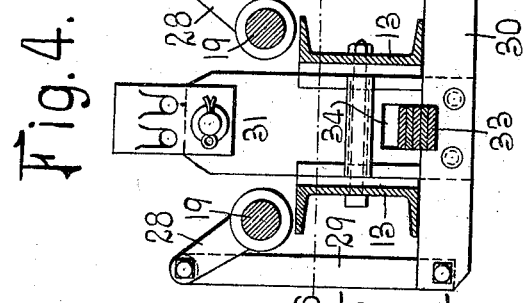
Witnesses
Edgar T. Farmer
Nellol Church
Inventor:
George F. Steedman
by Bakewell Cornwall Att'y's

UNITED STATES PATENT OFFICE.

GEORGE F. STEEDMAN, OF ST. LOUIS, MISSOURI.

ELEVATOR.

No. 841,065. Specification of Letters Patent. Patented Jan. 8, 1907.

Original application filed March 12, 1906, Serial No. 305,652. Divided and this application filed July 2, 1906. Serial No. 324,381.

*To all whom it may concern:*

Be it known that I, GEORGE F. STEEDMAN, a citizen of the United States, residing at St. Louis, Missouri, have invented a certain new and useful Improvement in Elevators, of which the following is a full, clear, and exact description, such as will enable others skilled in the art to which it appertains to make and use the same, reference being had to the accompanying drawings, forming part of this specification, in which—

Figure 1 is a front elevation of a portion of an elevator-cage embodying the features of my invention. Fig. 2 is a side elevation of the cage shown in Fig. 1. Fig. 3 is a plan view of Fig. 1. Fig. 4 is a sectional view on the line 4 4 of Fig. 1. Fig. 5 is a view, partly in section, taken on the line 5 5 of Fig. 2; and Fig. 6 is a sectional view on the line 6 6 of Fig. 4.

This invention relates to elevators, and particularly to the cages of elevators.

The object of my invention is to provide a "knockdown" elevator-cage provided with a safety device of novel construction. In my Patent No. 831,248, dated September 18, 1906, I have shown and claimed a knockdown elevator-cage of the same construction as the cage shown and described in this application. The claims of said application, however, do not include the safety device as forming an independent element of the cage, and the present application is a divisional of my application, which resulted in the patent above referred to, and is directed to a knockdown cage provided with a safety device of novel construction.

Prior to my invention it has been the general practice to either ship the cage assembled from the factory to the place where the elevator was installed or else ship the parts of the cage and send an experienced elevator-man to put the cage together. If the cage is shipped assembled, the freight rate on the same is exceedingly high on account of the height and bulkiness of the cage, and if all of the parts are shipped disassembled and an experienced elevator-man is sent to put the parts together the cost of his services enhances greatly the cost of manufacture of the elevator.

My improved elevator-cage comprises very few parts—namely, a platform part provided with some of the members of the safety device, which is built at the factory and shipped complete, and an upper part provided with some of the members of the safety device, which is also built at the factory and shipped complete, the upper part lying flat upon the platform part, so that the cage occupies very little space and accordingly can be shipped at a low freight classification. When the cage arrives at the place where the elevator is to be installed, the upper part can be attached to the platform part by simply driving a few rivets and the upper members of the safety device can be connected up with the lower members by links so that it is unnecessary to employ a skilled mechanic to set up the cage.

Referring to the drawings, which represent the preferred form of my invention, 1 designates the floor of the platform, which preferably consists of wood and is supported by horizontal members 2, extending the full width of the platform at the front and back, and side horizontal members 3, extending the full length of the platform. These horizontal members preferably consist of channels, which are secured together in the form of a rectangle, and thus a very rigid construction is produced.

I have shown only one-half of the cage in the drawings, but it will of course be understood that the other half of the cage is identical with that shown. Secured to each of the side horizontal members 3 by rivets 4 is a casting which is of novel construction and forms one of the important features of my cage. Said casting consists of ears 5, that embrace the guide 6 on the elevator-frame on which the cage travels; an upwardly-projecting portion 7, that is secured to a vertical member comprising a portion of the upper part of the cage; bearings 9, which receive the rock-shafts 10, comprising part of the safety devices, and surface 11, which coöperates with buffers 12 on the elevator-frame. The upper part of the cage consists of two horizontal members 13, preferably channels, which are secured by rivets 14 to castings having ears 15, which embrace the guide of the elevator-frame, said castings extending between said horizontal members, as shown in dotted lines in Fig. 1. On the upper portion of each of said castings is a boss 16, that receives a cylindrical buffer 17, which coöperates with a surface on the elevator-frame, and said castings are also provided with bearings 18, which receive the shafts 19, forming part of the safety devices. The portion of the casting that extends between the horizontal members 13 is hollow and receives the vertical member 20, which is secured to said casting by rivets 21, as shown in dotted lines in Fig. 2, the lower portion of said vertical member being secured to the upwardly-projecting portion 7 of the casting of the platform part by rivets 22, (shown in dotted lines in Fig. 2,) which rivets 22 are adapted to be driven at the place where the elevator is set up.

The platform part of the cage, comprising the wooden floor, horizontal members 2, and side members 3, with the castings connected thereto and the rock-shafts 10, mounted in said castings, is assembled at the factory, and the upper part of the cage, comprising the vertical members 20, horizontal members 13, and castings connecting them together, together with the rock-shafts 19, mounted in said castings, is assembled at the factory. These two parts are placed one on top of the other for shipment and are connected together to form the complete cage by simply driving the rivets 22, as previously described, and connecting up the rock-shafts of the safety device, as hereinafter described.

To strengthen the cage, diagonal braces or cross-rods 23 and 24 are carried by the castings of the upper part of the cage and are adapted to be secured to the platform part when the cage is set up, the upper castings being provided with openings through which the braces 24 extend and with ears or lugs 25, through which the braces 23 extend, and the lower castings being provided with ears 25' to receive the braces 24. The object in providing the cage with safety devices at the bottom as well as at the top of the cage is to prevent the platform part of the cage from being torn away from the upper part of the cage in case the hoisting apparatus should break while the cage was provided with a heavy load, this being liable to occur in case the cage were provided with safety devices only at its top. The rock-shafts 19 and 10 have pairs of dogs 26 and 27, rigidly connected thereto, and the rock-shafts 19 are provided with arms 28, which, as shown in Fig. 4, are connected by links 29 to a cross-bar 30, carried by a slide 31, that is connected to the rope 32 of the hoisting apparatus. A spring 33 (shown in dotted lines in Fig. 1) is connected to the horizontal members of the upper part of the cage and extends through an opening 34 in the slide 31, so that said spring is normally under compression. In case the rope of the hoisting apparatus should break, however, said spring being relieved will force the slide and cross-bar downwardly, thereby rocking the shafts 19 to cause the pair of dogs 26 to engage the guide 6 of the elevator-frame. The dogs 26 are connected to the dogs 27 at the bottom of the cage by means of links 36, so that said dogs will be actuated simultaneously with the upper dogs. It is obvious that in place of the rope 32 a piston-rod of a direct-acting hoist can be substituted therefor.

Having thus described my invention, what I claim as new, and desire to secure by Letters Patent, is—

1. In an elevator provided with hoisting means, a cage comprising an upper member, a platform detachably connected to said upper member, castings secured to said platform, a rock-shaft mounted in said castings with dogs rigidly fastened thereto adapted to engage the guides on which the cage travels, a rock-shaft mounted in castings which are secured to the upper member and having an arm rigidly fastened thereto, means for imparting rotary movement from the upper to the lower rock-shaft, and means connected to the arm of the upper rock-shaft for actuating said shaft in case the hoisting means fails to fulfil its function whereby said dogs are caused to become operative; substantially as described.

2. In an elevator provided with hoisting means, a cage comprising an upper member, a platform detachably connected to said upper member, rock-shafts under said platform with dogs rigidly fastened thereto which are adapted to engage the guides on which the cage travels, rock-shafts carried by the upper member having arms rigidly fastened thereto, dogs on said rock-shafts, means connecting the upper and lower rock-shafts so that they will rotate simultaneously, and means connected to the arms on the upper rock-shafts for actuating said shafts in case the hoisting means fails to fulfil its function whereby said dogs are caused to become operative; substantially as described.

3. An elevator-cage comprising an upper horizontal member to which the hoisting mechanism of the elevator is attached, a platform, a vertical member and diagonal braces for detachably connecting the upper member to the platform, castings constructed to receive the horizontal and vertical members to connect them together and provided with openings to receive the diagonal braces, said castings being provided with ears to coöperate with the guides on the elevator-frame, a rock-shaft arranged on each side of said horizontal member and mounted in said castings, dogs rigidly connected to said shafts for engaging the guides on which the elevator-cage travels, a pair of rock-shafts connected to the underneath side of the platform and provided with dogs which engage said guides, and links for connecting said upper and lower rock-shafts together; substantially as described.

In testimony whereof I hereunto affix my signature, in the presence of two witnesses, this 28th day of June, 1906.

GEORGE F. STEEDMAN.

Witnesses:
HARRY A. HEPER,
GEO. E. HOFFMANN.